United States Patent
Salsbury et al.

(10) Patent No.: US 9,348,325 B2
(45) Date of Patent: May 24, 2016

(54) SYSTEMS AND METHODS FOR DETECTING A CONTROL LOOP INTERACTION (75) Inventors: Timothy I Salsbury, Whitefish Bay, WI (US); John M House, Montreal (CA); John E Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 713 days.

(21) Appl. No.: 13/361,857

(22) Filed: Jan. 30, 2012

(65) Prior Publication Data
US 2013/0197676 A1 Aug. 1, 2013

(51) Int. Cl.
G05B 13/02 (2006.01)

(52) U.S. Cl.
CPC .................................. G05B 13/02 (2013.01)

(58) Field of Classification Search
CPC ...................................................... G05B 13/02
USPC .................. 700/286, 291, 293, 292, 276–278
See application file for complete search history.

(56) References Cited

U.S. PATENT DOCUMENTS

| 4,602,326 | A | * | 7/1986 | Kraus ............................... 700/38 |
| 5,355,305 | A | | 10/1994 | Seem et al. |
| 5,406,474 | A | * | 4/1995 | Hansen ............................ 700/37 |
| 5,506,768 | A | | 4/1996 | Seem et al. |
| 5,568,377 | A | | 10/1996 | Seem et al. |
| 6,055,524 | A | * | 4/2000 | Cheng ............................... 706/23 |
| 6,219,590 | B1 | | 4/2001 | Bernaden, III et al. |
| 6,296,193 | B1 | | 10/2001 | West et al. |
| 6,546,295 | B1 | * | 4/2003 | Pyotsia et al. .................. 700/37 |
| 6,937,909 | B2 | | 8/2005 | Seem |
| 7,031,880 | B1 | | 4/2006 | Seem et al. |
| 7,496,472 | B2 | | 2/2009 | Seem |
| 7,729,882 | B2 | | 6/2010 | Seem |
| 2002/0177909 | A1 | * | 11/2002 | Fu et al. .......................... 700/28 |
| 2004/0088058 | A1 | * | 5/2004 | Ettaleb et al. .................. 700/26 |
| 2005/0004685 | A1 | | 1/2005 | Seem |
| 2005/0222694 | A1 | * | 10/2005 | Coogan et al. .................. 700/42 |
| 2008/0183424 | A1 | | 7/2008 | Seem |
| 2008/0294291 | A1 | * | 11/2008 | Salsbury ....................... 700/277 |
| 2009/0144023 | A1 | | 6/2009 | Seem |
| 2010/0010681 | A1 | * | 1/2010 | Zugibe et al. ................. 700/282 |
| 2010/0219808 | A1 | * | 9/2010 | Steckley et al. ............ 324/76.77 |
| 2011/0190909 | A1 | | 8/2011 | Salsbury |

OTHER PUBLICATIONS

"Chedzoy, O.B., Phi-Coefficient", 2006, John Wiley & Sons Inc, Encyclopedia of Statistical Sciences, p. 1.*

* cited by examiner

*Primary Examiner* — Darrin Dunn
*Assistant Examiner* — Derrick Boateng
(74) *Attorney, Agent, or Firm* — Foley & Lardner LLP (57) ABSTRACT A system for detecting a control loop interaction between two or more control loops. The system includes a processing circuit configured to store a history of detected loop disturbances for a plurality of control loops. The processing circuit is also configured to compute a measure of interaction between control loops using the history of detected loop disturbances. The processing circuit is further configured to determine whether a loop interaction exists based on the computed measure of interaction.

20 Claims, 8 Drawing Sheets

SYSTEMS AND METHODS FOR DETECTING A CONTROL LOOP INTERACTION

BACKGROUND

The present disclosure generally relates to the field of feedback controllers, and more particularly to detecting a control loop interaction between two or more control loops.

Feedback controllers are used to control variable devices such as valves, pumps, and dampers in control systems or processes. The object of such controllers is to control the device in a way that maintains a controlled variable (e.g., temperature, humidity, flow rate, pressure, etc.) at a desired setpoint. Many feedback controllers respond to feedback based on one or more control parameters. A common control parameter used in feedback algorithms is proportional gain (i.e., the proportional term, the gain, etc.)—a value that is used by a feedback algorithm to determine the magnitude of the adjustment to the controlled signal given the error signal. For example, when provided the same error signal, a feedback algorithm with a high gain generally results in a large adjustment to the controlled signal while a small gain generally results in a small adjustment to the controlled signal. In addition to the proportional gain an integral term is often used by feedback algorithms (e.g., in proportional plus integral (PI) control algorithms, in proportional-integral-derivative (PID) control algorithms, etc.).

In dynamic systems (e.g., where conditions outside of the control loop are affecting the controlled variable or where an aspect of the control loop is variably imperfect), the optimal control parameters for the feedback algorithm are often also dynamic. Accordingly, some feedback controllers or feedback algorithms are periodically tuned (e.g., manually, automatically) based on observed historical behavior of the system. Other feedback controllers or feedback algorithms include adaptive tuning algorithms that automatically adjust the control parameters during normal operation of the feedback algorithm. Such adaptive tuning algorithms can provide for improved performance relative to tuning algorithms that run only periodically.

Pattern recognition adaptive control (PRAC) defines one class of adaptive tuning controllers. With PRAC, parameters that characterize the pattern of the closed-loop response are determined after significant setpoint changes or load disturbances have occurred. The control parameters for the feedback controller are then adjusted based on the determined pattern characteristics.

SUMMARY

One embodiment relates to a computerized method for detecting a control loop interaction. The method includes receiving an indication of a control loop disturbance detected by an adaptive controller for a first control loop. The method further includes storing, in a memory, a history of detected loop disturbances for the first control loop and at least a second control loop. The method yet further includes calculating, by a processor, a measure of interaction between the first and second control loops using the history of detected loop disturbances. The method also includes determining whether a loop interaction exists between the first and second control loops based in part on the measure of interaction. The method further includes using a communications interface to transmit data representing the result of the determination.

Another embodiment relates to a system for detecting a control loop interaction. The system includes a processing circuit configured to store, in a memory, a history of detected loop disturbances for two or more control loops. The processing circuit is further configured to calculate a measure of interaction between the two or more control loops using the history of detected loop disturbances. The processing circuit is also configured to determine whether a loop interaction exists between the two or more control loops based in part on the measure of interaction. The processing circuit is further configured to transmit data representing the result of the determination.

Another embodiment relates to a system for detecting a control loop interaction in a heating, ventilation, and air conditioning (HVAC) system. The system includes a first control loop and a second control loop. The first control loop includes a first adaptive controller configured to provide control over a first HVAC device and to detect loop disturbances when controlling the first HVAC device. The second control loop includes a second adaptive controller configured to provide control over a second HVAC device and to detect loop disturbances when controlling the second HVAC device. The system also includes a processing circuit configured to receive indications of detected loop interactions from the first controller and the second controller. The processing circuit is further configured to store, in a memory, a history of the detected loop disturbances. The processing circuit is also configured to calculate a measure of interaction between the first and second control loops using the history of detected loop disturbances. The processing circuit is further configured to determine whether a loop interaction exists between the first and second control loops based in part on the measure of interaction. The processing circuit is further configured to cause a communications interface to transmit data representing the result of the determination.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

In building automation systems and in other applications, multiple feedback controllers (e.g., PRAC-based controllers) and/or other types of controllers may be used to regulate the various devices of the system. A building automation system may include a heating, ventilation, and air conditioning (HVAC) subsystem that includes variable air volume (VAV) boxes, mixers, chillers, and other HVAC devices. In some cases, a controller regulating an HVAC device may utilize a feedback control loop to control the device to a particular setpoint (e.g., a temperature value, a pressure value, an airflow value, etc.).

Applicants have observed that for some control loops, a control loop regulating one device may unintentionally interact with the operation of another control loop regulating a different device. For example, adjacent building zones in an HVAC subsystem may interact due to intrazonal air flow, heat transfer, or zone-to-zone relationships. The performance of each controller might deteriorate when such interactions are present, causing oscillation and accompanying energy, comfort, and wear and tear penalties to performance. The identification of interacting control loops advantageously allows corrective measures to be taken (e.g., by changing the setpoints provided to both loops, applying a decoupling measure to the loops by addressing the cause of the interaction, alerting a user, increasing thermal insulation between the building zones, etc.).

Figure 1:
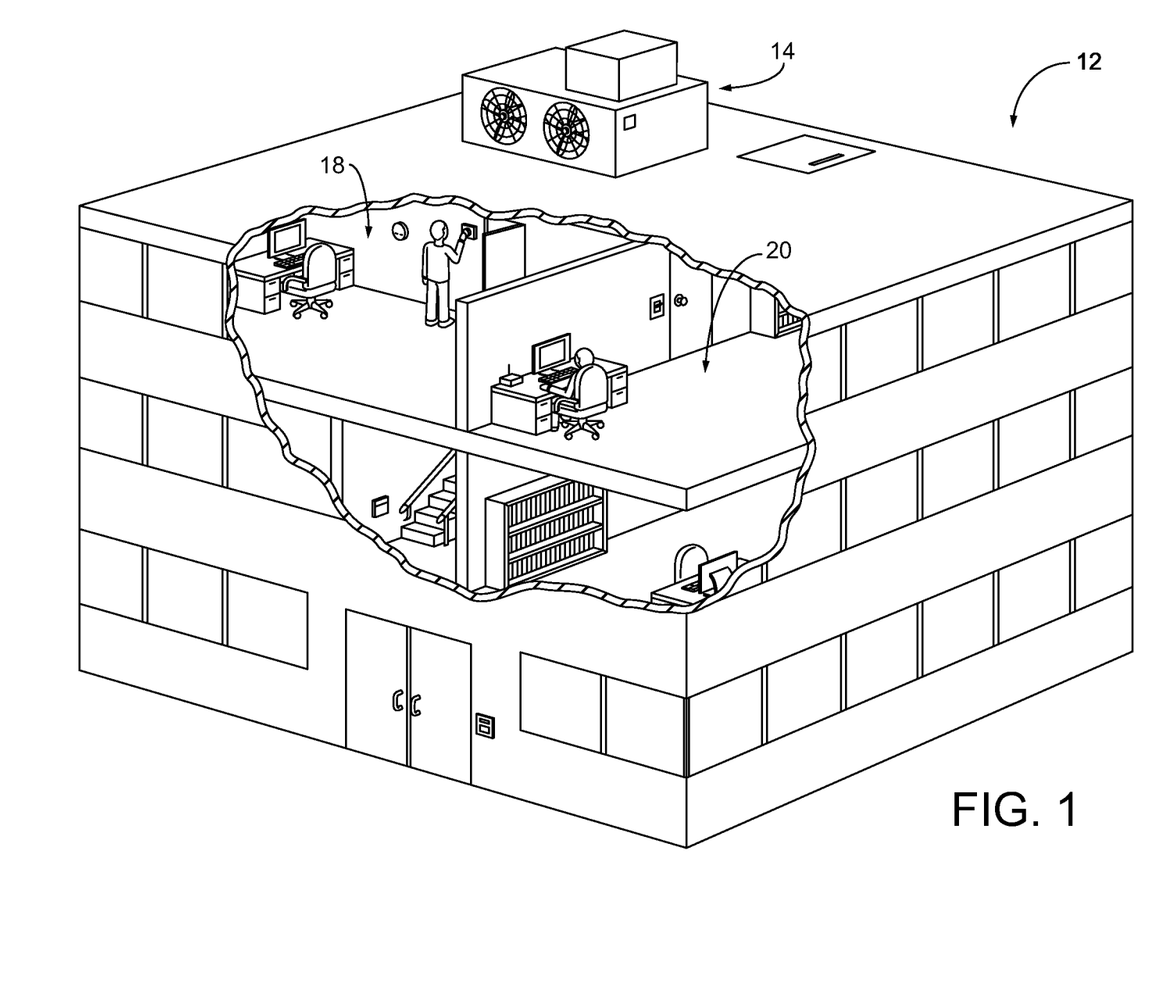
FIG. 1 is a perspective view of a building, according to an exemplary embodiment.

Referring now to FIG. 1, a perspective view of a building 12 is shown. Building 12 includes a number of floors, rooms, spaces, zones, and/or other building structures and areas. For example, building 12 may include zone 18 and zone 20. According to various exemplary embodiments, zone 18 and zone 20 of building 12 may be any area of any size or type, including an outdoor area. The systems, devices, control modules and methods of the present disclosure may be implemented in building 12 and in building automation systems (including, e.g., a rooftop air handing unit 14, a controller thereof, a control loop for adjusting the amount of ventilation provided to a building space, etc.) serving building 12.

Figure 2:
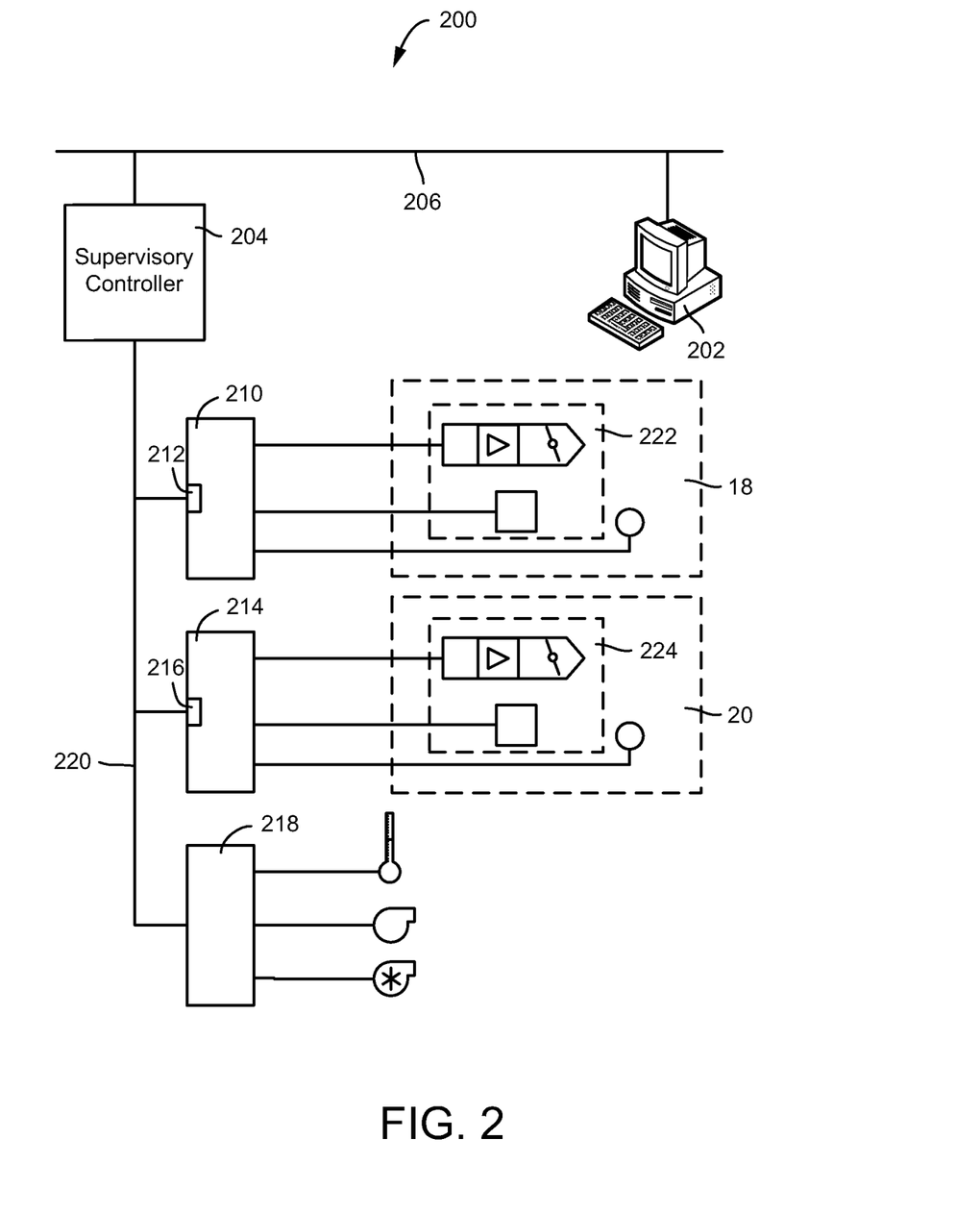
FIG. 2 is a schematic block diagram of a control system for the building of FIG. 1, according to an exemplary embodiment.

Referring to FIG. 2, a schematic block diagram of a climate control system 200 is shown, according to an exemplary embodiment. Climate control system 200 is used to control a controlled variable of a building zone (e.g., a climate condition of the building zone, a temperature, an oxygen level, an air pollutant level, a humidity level, etc.), according to an exemplary embodiment. Climate control system 200 is shown to include a workstation 202, a supervisory controller 204, and a plurality of controllers 210, 214, and 218, according to an exemplary embodiment. Controllers 210, 214, and 218 are coupled to supervisory controller 204 which may provide dynamically changing setpoints to controllers 210, 214, and 218 via communication link 220 (e.g., a building network, a wireless network, a wired network, separate communication links, etc.). Controllers 210 and 214 are shown to include communication ports 212 and 216 for coupling to communication link 220. Workstation 202 and supervisory controller 204 are shown as communicably coupled via communication bus 206 (e.g., in-building network, wireless network, an IP network, etc.). Communication bus 206 and communication link 220 can be coupled to additional sections and additional controllers, as well as any other components, systems, or devices. According to one exemplary embodiment, climate control system 200 is a building automation system such as a METASYS system sold by Johnson Controls, Inc. In such an embodiment, supervisory controller 204 may be a Network Automation Engine (NAE) device sold by Johnson Controls.

Climate control system 200 may include any number of different HVAC devices that may be used to regulate the climate within a building. For example, climate control system 200 may include any number of variable air volume (VAV) boxes, mixers, chillers, and other HVAC devices. Supervisory controller 204 and/or controllers 210, 214, 218 may receive measurement data (e.g., a temperature measurement, a pressure measurement, an airflow measurement, a humidity measurement, etc.) from one or more sensors in climate control system 200. Supervisory controller 204 and/or controllers 210, 214, 218 may also receive one or more parameters (e.g., a desired zone temperature, a desired energy consumption limit, etc.). Supervisory controller 204 and/or controllers 210, 214, 218 may use the measurement data and/or parameters to control the HVAC devices in climate control system 200. For example, a controller may compare a temperature measurement to a temperature setpoint (e.g., a desired temperature) and regulate one or more HVAC devices to provide heating or chilling to an area of the building.

In one embodiment, controller 210 is communicably connected to VAV box 222 and controller 214 is shown as communicably connected to VAV box 224. VAV boxes 222, 224 may regulate the amount of conditioned air provided by climate control system 200 to various areas of a building. For example, VAV box 222 may supply conditioned air to zone 18 in FIG. 1 and VAV box 224 may supply conditioned air to zone 20 in FIG. 1. Similarly, supervisory controller 204 may provide supervisory control over all of building 12 or an area of building 12 that includes zones 18, 20 (e.g., a wing of building 12, a floor of building 12, etc.).

Figure 3:
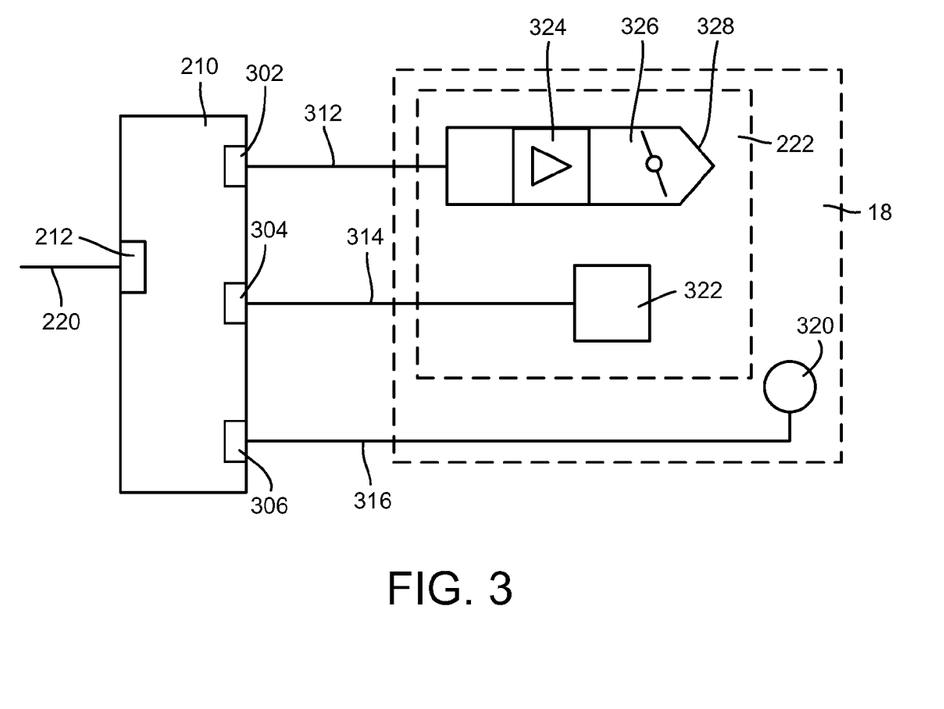
FIG. 3 is a schematic block diagram of a controller and a variable air volume box of the control system of FIG. 2, according to an exemplary embodiment.

In FIG. 3, a portion of FIG. 2 is shown in greater detail. VAV box 222 is shown to include a damper 326, an air flow sensor 324, and an actuator 322. Actuator 322 positions damper 326 based on signals provided to it from controller 210 via control line 314 and actuator output 304. The position of damper 326 controls the amount of air flow (e.g., sensed by air flow sensor 324) provided to the building zone 18 (e.g., a room, hallway, building, a portion thereof, or other internal environment). Controller 210 receives a temperature signal from a temperature sensor 320 via control line 316 at temperature input 306. In an exemplary embodiment, controller 210 is configured to appropriately position actuator 322 (and therefore the damper 326) in accordance with a control algorithm (e.g., that determines a position intended to reduce the error between the setpoint and the measured controlled variable).

In an exemplary embodiment, the algorithm or control strategy used to control actuator 322 is or includes an integral (I) control strategy, a proportional (P) control strategy, a proportional integral (PI) control strategy, a proportional derivative (PD) control strategy, or a proportional-integral-derivative (PID) control strategy. The control strategy can utilize feedback and/or feedforward control to regulate one or more controlled variables to a setpoint. In accordance with embodiments of the control strategy for FIG. 3, at every cycle controller 210 receives, for example, the temperature value at temperature input 306 and provides an actuator control signal at actuator output 304 to position damper 326 in a manner that is calculated to bring the controlled variable (e.g., the temperature value) closer to the setpoint. Controller 210 can also cyclically respond to the air flow value. According to various exemplary embodiments, the system can utilize temperature, humidity, flow rate, pressure, or any other available input to assist in calculating an optimal actuator position. Regardless of the number or types of variables used in the control strategy, however, controller 210 may be configured to primarily use feedback of a controlled variable (e.g., actual room temperature) relative to a setpoint (e.g., target temperature) to determine new control signals (e.g., new position control signals for actuator 322) for the process system. A PRAC algorithm may be used by controller 210 to adjust one or more parameters used in a control loop of controller 210.

According to various exemplary embodiments, temperature sensor 320 can be a resistive sensor (e.g., a thermister) located in a building environment or any other type of temperature sensor. Actuator 322 may be an electric motor-based actuator, a pneumatic actuator, a hydraulic actuator, or any other type of device for controlling and positioning damper 326, which controls the flow of air through exhaust 328. VAV box 222 may additionally include fans, heating or cooling units, exhaust dampers, and return dampers for treating an air flow. Interfaces 302 and 306 can be or include analog inputs or can be or include digital inputs. Controller 210 can include circuitry and/or software for transforming, conditioning or interpreting the signals on inputs 302 and 306. For example, controller 210 may include an A/D converter configured to transform analog input signals into digital information for processing. Air flow sensor 324 provides a parameter such as an air flow parameter via link 312 to I/O 302. The air flow parameter can represent the amount of air flow provided through damper 326 to an environment. Air flow sensor 324 can be a differential pressure sensor which provides a factor related to air flow (volume/unit time). Air flow sensor 324 and its output can be used by controller 210 in its control algorithm for attempting to cause the controlled variable to reach a setpoint.

The control signal provided to actuator 322 may be a pulse width signal which causes actuator 322 to rotate, move forward, move backward, or to stay in the same position. Controller 210 may internally keep track of the position of actuator 322 as it is moved. Alternatively, actuator 322 may provide feedback indicative of its position, or the actuator signal may indicate the particular position to which actuator 322 should be moved.

While the systems and methods of the present disclosure and more specifically FIGS. 2-3 are primarily described with reference to temperature regulation systems including a VAV box, it should be appreciated that other process systems or plants (e.g., mechanical equipment used to affect a controlled variable) and control loops thereof may be configured to include the systems and/or methods of the present disclosure. For example, in another exemplary embodiment, the systems and methods of the present disclosure can be utilized with air handling units (AHUs). These AHUs may have water-to-air heat exchangers for providing heating or cooling to an air stream. The flow of water through the coils is regulated by a hydronic valve, which is moved by an electric actuator connected to a controller. The valve position is controlled (e.g., using a PRAC-based control loop) to maintain the air temperature at the output of the heat exchangers within a specific range (i.e., to one or more setpoints).

Figure 4:
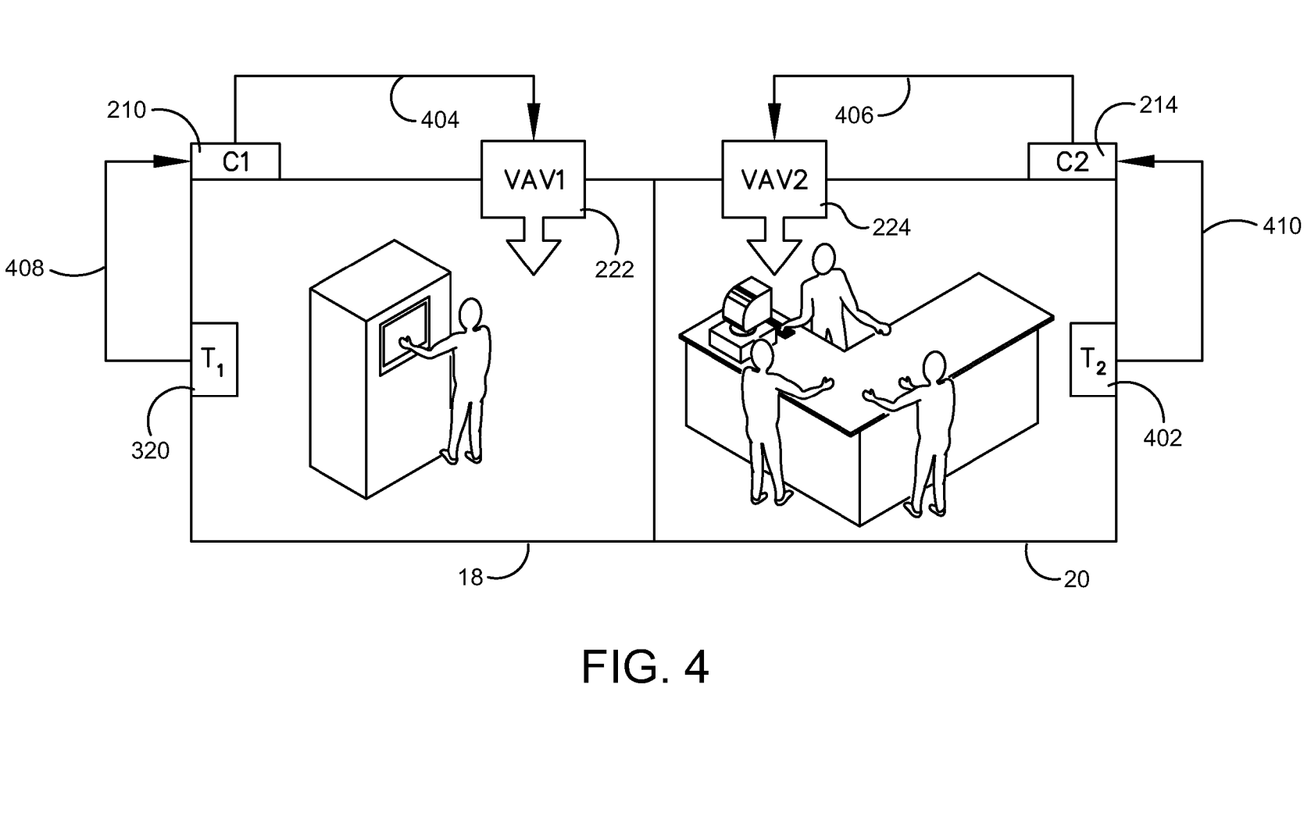
FIG. 4 is an illustration of two HVAC control loops, according to an exemplary embodiment.

Referring now to FIG. 4, building zones 18 and 20 are shown in greater detail, according to an exemplary embodiment. As shown, zones 18 and 20 are adjacent to each other, although zones 18 and 20 may be in other locations (e.g., one zone is above another, one or more zones are between zones 18 and 20, etc.). VAV box 222 is used to regulate the temperature in zone 18 by controlling the amount of heated or chilled air provided to zone 18 by the HVAC devices in climate control system 200. Similarly, VAV box 224 is used to regulate the temperature in zone 20 by also controlling the amount of heated or chilled air provided to zone 20.

In some embodiments, controllers 210 and 214 each utilize a feedback control loop to regulate temperature in their respective zones. For example, controller 210 may receive a temperature measurement 408 from temperature sensor 320 located in zone 18. Controller 210 may use temperature measurement 408 as a feedback value by comparing temperature measurement 408 to a temperature setpoint. For example, a temperature setpoint may be received at controller 210 from a supervisory controller, a thermostat, a setpoint determined by controller 210 itself (e.g., based on a power consumption, a preset parameter in memory, etc.), or from any other source. Based on the comparison between temperature measurement 408 and the temperature setpoint, controller 210 adjusts control command 404 used to control VAV box 222. For example, if temperature measurement 408 is greater than the temperature setpoint, this may indicate that additional chilled air should be provided to zone 18. In response, controller 210 may issue control command 404 to actuator 322 of VAV box 222 to cause damper 326 to open. Similarly, controller 214 may adjust control command 406 used to control VAV box 224, based on a comparison of a temperature setpoint to temperature measurement 410 (e.g., received by controller 214 from temperature sensor 402 located in zone 20).

A control loop interaction may exist between the control loops of controllers 210 and 214. In general, a control loop interaction refers to the condition in which a control loop influences one or more other unrelated control loops. These types of interactions lead to oscillations and other unwanted system conditions. Since the control loops are unrelated, their interactions are also difficult to predict. By way of example, controller 214 may cause the damper in VAV box 224 to further close in response to temperature in zone 20 dropping. If VAV box 224 and VAV box 222 are supplied by the same air duct, further closing the damper of VAV box 224 may also increase the pressure in the supply duct. This added pressure in the duct can also increase the flow through VAV box 222. To compensate for the sudden change in conditions, controller 210 may adjust the position of damper 326 in VAV box 222 in response. Other control loops may also be affected by controller 210 adjusting damper 326 in VAV box 222 (e.g., other control loops used to control other VAV boxes, a control loop for a supply fan for the duct, etc.).

According to systems and methods of the present application, detection of control loop interactions are made by comparing control loop disturbances over time among different control loop pairs or groups. A disturbance may be, for example, a significant setpoint change or load change in a control loop. If two or more control loops interact, a disturbance in the first loop is likely to cause a repeatable disturbance in the second (i.e., disturbed) loop. Therefore, the presence of control loop disturbances, as well as when disturbances in different loops occur relative to each other, may be used to determine whether or not certain control loops interact.

Knowledge of a control loop interaction allows corrective measures to be taken. For example, a technician may make physical changes to the controlled environments to reduce or eliminate interaction between control loops (e.g., adding insulation between rooms, changing the size or shape of an air duct, etc.). In other embodiments, corrective measures may be taken at the controller level to prevent control loops from interacting. For example, various controller-level measures are disclosed in U.S. patent application Ser. No. 12/125,843, entitled "Building Automation Systems and Methods for Controlling Interacting Control Loops."

Figure 5:
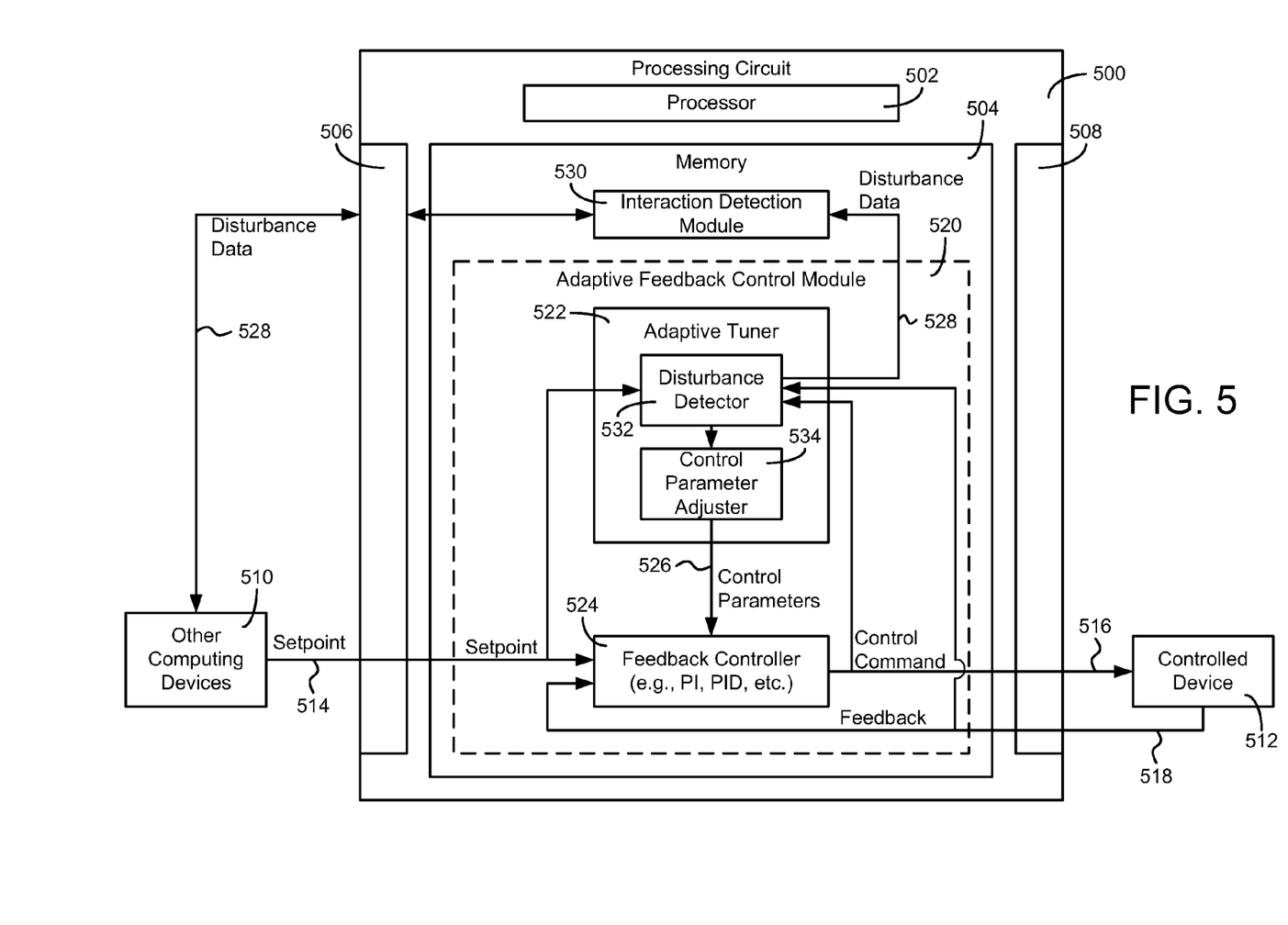
FIG. 5 is a block diagram of a processing circuit configured to detect a loop interaction, according to an exemplary embodiment.

Referring now to FIG. 5, a schematic block diagram of a processing circuit is shown, according to an exemplary embodiment. Processing circuit 500 includes a processor 502 and a memory 504. Processing circuit 500 is configured to receive inputs and to provide outputs via interfaces 506, 508. Processing circuit 500 can be a circuit containing one or more processing components (e.g., processor 502) or a group of distributed processing components (e.g., spanning multiple controllers). Processor 502 may be a general purpose or specific purpose processor configured to execute computer code or instructions stored in memory 504 or received from other computer readable media (e.g., a CDROM, a DVDROM, other computing devices 510, a remote storage device, etc.). Processing circuit 500 is also shown to include memory 504. Memory 504 may be RAM, hard drive storage, temporary storage, non-volatile memory, flash memory, optical memory, or any other suitable memory for storing software objects and/or computer instructions. When processor 502 executes instructions for completing the various activities described herein and stored in memory 504 or another computer readable medium, processor 502 generally configures the system and more particularly processing circuit 500 to complete such activities. Memory 504 may include database components, object code components, script components, and/or any other type of information structure for supporting the various activities described in the present disclosure. For example, memory 504 may store data regarding the operation of a controller (e.g., previous setpoints, previous behavior patterns regarding used energy to adjust a current value to a setpoint, etc.). According to an exemplary embodiment, memory 504 is communicably connected to processor 502 and includes computer code for executing one or more processes described herein and processor 502 is configured to execute the computer code.

Interfaces 506, 508 provide data connections between processing circuit 500, other computing devices 510 (e.g., another controller, a server, a portable electronic device, a display, etc.), and controlled device 512 (e.g., a device that receives control command 516). The data connections may be any combination of wired connections (e.g., via a cable, data bus, etc.) and/or wireless connections (e.g., cellular, radio frequency, WiFi, etc). For example, interface 508 may provide a wired connection between processing circuit 500 and controlled device 512. In some embodiments, the data connections provided by interfaces 506, 508 may include any number of intermediary circuits or devices. For example, the data connection between processing circuit 500 and other computing devices 510 may include any number of routers, gateways, servers, or other computing devices that relay communication data between processing circuit 500 and other computing devices 510 or controlled device 512. In further embodiments, interfaces 506, 508 may be part of a shared interface.

Memory 504 is shown to include adaptive feedback control module 520. Adaptive feedback control module 520 is the primary logic module configured to provide the feedback-based control activity of processing circuit 500. In an exemplary embodiment, adaptive feedback control module 520 includes feedback controller 524 which utilizes a feedback control strategy (e.g., PI, PID, etc.) to adjust control command 516, thereby regulating controlled device 512. Feedback controller 524 uses setpoint 514 from interface 506 (e.g., the setpoint 514 originating at a supervisory controller) and feedback data 518 (e.g., originating from a temperature sensor in the system) from interface 508 to calculate or otherwise obtain control command 516. Feedback controller 524 uses the difference between setpoint 514 and feedback data 518 to estimate an amount of error between the two values. Feedback controller 524 uses the estimated error to adjust control command 516.

Adaptive feedback controller 520 is shown to include adaptive tuner 522. Adaptive tuner 522 is shown to include control parameter adjuster 534. In general, adaptive tuner 522, using control parameter adjuster 534, is configured to adaptively determine control parameters 526 (e.g., proportional gain, integral gain, other parameters of a transfer function, etc.) for use by feedback controller 524. Adaptive tuner 522 may tune control parameters based on a model reference adaptive control (MRAC) approach, a pattern recognition adaptive control (PRAC) approach, or another adaptive tuning approach.

Adaptive tuner 522 is shown to include disturbance detector 532. Disturbance detector receives control loop data (e.g., setpoint 514, control command 516, the measured value used as feedback 518, etc.) and uses the control loop data to determine whether a disturbance has occurred in the control loop of feedback controller 524. In various embodiments, disturbance detector 532 may base a disturbance determination on significant setpoint changes, changes in the behavior of the load (e.g., controlled device 512, another controlled device, etc.), or on other parameters or observed control loop behaviors/changes that indicate that the control loop has experienced a disturbance (i.e., a deviation from steady-state performance). Some adaptive tuning controllers include disturbance detection features. For example, PRAC controllers that utilize disturbance detection and various improvements thereto are described in, e.g., U.S. Pat. Nos. 5,355,305 and 6,937,909. In one embodiment, a significant setpoint change may be detected in a PRAC controller when a setpoint change has a greater magnitude than the tune noise band. In another embodiment, a load disturbance may be detected in a PRAC controller by comparing the error (e.g., the difference between a setpoint and a smoothed signal) to that of the tune noise band. If the absolute value of the error exceeds the tune noise band for two consecutive samples, a load disturbance is considered to have occurred. In further embodiments, other ways of detecting loop disturbances may be used (e.g., if another adaptive control strategy is used in adaptive feedback control module 520).

Control parameter adjuster 534 receives disturbance data from disturbance detector 532. Using the received disturbance data control parameter adjuster may adjust (or further adjust) control parameters for use by feedback controller 524. The control parameters 526 may include, for example, proportional gain (K) and integral time ($T_i$) values when the feedback controller 524 utilizes a PI control strategy. In another example, only the proportional gain (K) may be provided to feedback controller 524 (e.g., if feedback controller 524 utilizes a P control strategy). In other embodiments, different control parameters may be provided by adaptive tuner 522 based on the control strategy employed by feedback controller 524 (e.g., a derivative time for a PID control strategy, etc.).

Processing circuit 500 includes interaction detection module 530 (e.g., within memory 504). Interaction detection module 530 is configured to determine whether control loops (e.g., the control loop of feedback controller 524 and another control loop) interact. Interaction detection module 530 receives control loop disturbance data from disturbance detector 532 of adaptive tuner 522.

If controlled device 512 is a VAV box and feedback 518 is a temperature measurement, a sudden change in temperature may indicate a disturbance in the control loop of feedback controller 524. In another example, a sudden change in setpoint 514 may also be indicative of a control loop disturbance. In either case, disturbance detector 532 may provide disturbance data to interaction detection module 530.

Interaction detection module 530 analyzes disturbances from two or more control loops to determine whether a loop interaction condition exists. For example, interaction detection module 530 may receive disturbance data 528 (e.g., information about detected disturbances from other control loops) from other computing devices 510 (e.g., another processing circuit similar to processing circuit 500). Disturbance data 528 may be time-stamped boolean values that represent whether or not a disturbance occurred during a period of time. For example, disturbance data 528 may represent whether a ten-minute increment experienced a disturbance using a data string that includes the stop time, start time, and a boolean value indicating the presence of a disturbance. In other embodiments, the data string can indicate the value most related to the disturbance (e.g., a measured value disturbance, a setpoint disturbance, etc.).

Interaction detection module 530 may utilize disturbance data for two control loops to calculate a measure of interaction between the control loops. The measure of interaction is a statistic, value, or other indicator of the existence or amount of relationship between disturbances for two different control loops. Disturbances that repeatedly appear in two control loops at the same time may have a high measure of interaction. Interaction detection module 530 may use the measure of interaction to determine whether or not an unexpected or undesirable interaction exists between two control loops. Interaction detection module 530 may use the measure of interaction to quantify the likelihood that a loop interaction has been detected.

Interaction detection module 530 may provide an indication of a detected loop interaction to one or more other devices. For example, interaction detection module 530 may provide an alert to a user interface device (e.g., a display, a speaker, etc.), to alert a user about the detected loop interaction. In another example, interaction detection module 530 may provide an indication to other computing devices 510 (e.g., a supervisory controller, another controller, a workstation, etc.). The other computing devices may use the information of the indication to inform a user (e.g., provide output via e-mail, a speaker, a display, etc.). In other embodiments, the other computing devices may use the information of the indication to automatically adjust the affected control loops to compensate for the interaction.

Processing circuit 500 may use communications interface 506 to transmit the indication of the detected loop interaction to the other computing devices 510 via a network connection (e.g., wired, wireless). The indication of the detected loop interaction may include two identifiers, one for each of the interacting control loops, a boolean value indicating the existence of the interaction, and/or a magnitude of the interaction. In some embodiments, the indication of the detected loop interaction will include data representing directionality. For example, the indication of the detected loop interaction may use a disturber identifier, disturbed identifier pair to indicate that the first loop of the pair interacts to disturb the other loop.

Figure 6:
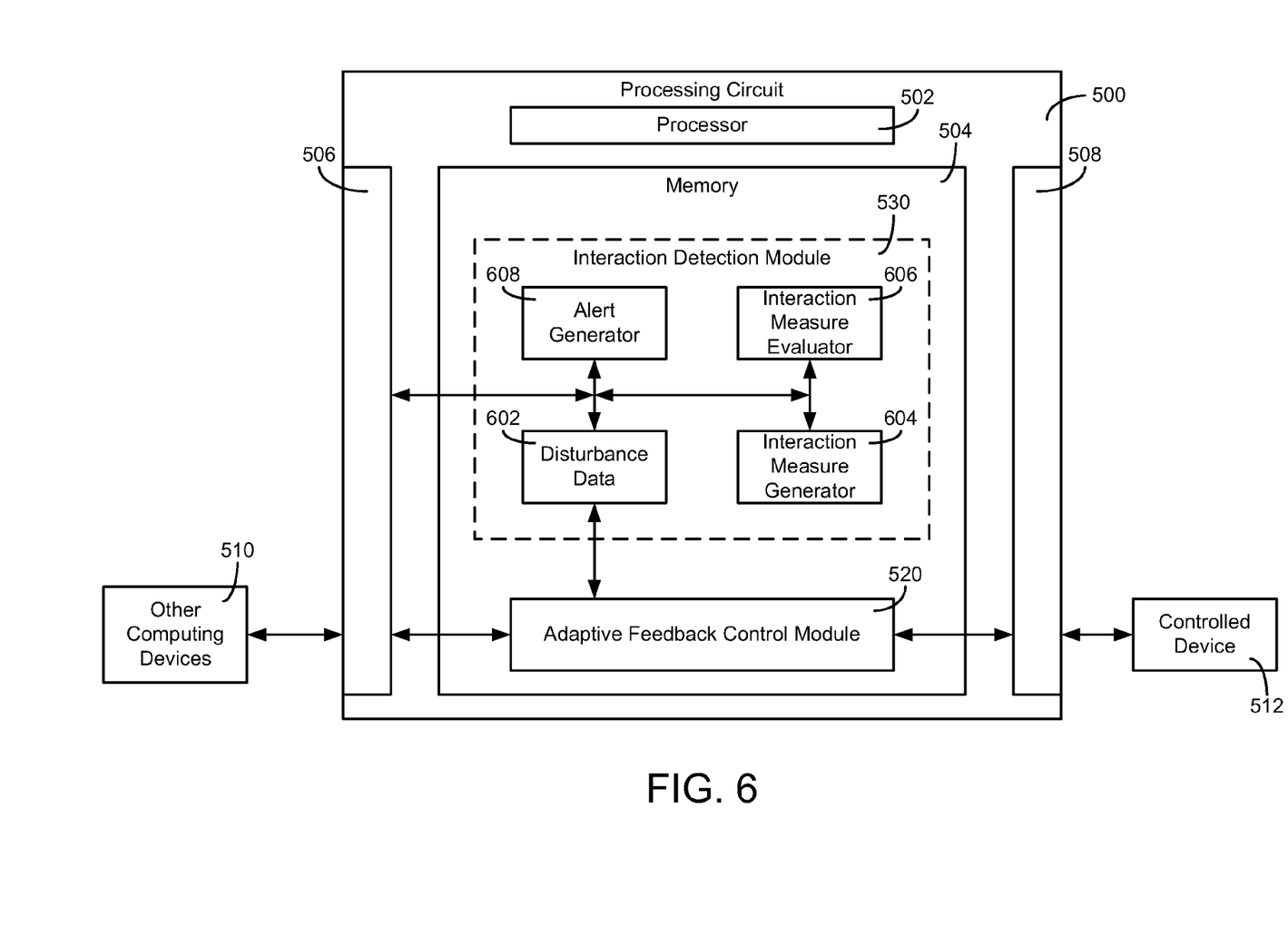
FIG. 6 is a another block diagram of the processing circuit of FIG. 5, showing a detailed view of the interaction detection module of FIG. 5, according to an exemplary embodiment.

Referring now to FIG. 6, the interaction detection module 530 of FIG. 5 is shown in greater detail, according to an exemplary embodiment. Interaction detection module 530 is shown to include disturbance data 602. Disturbance data 602 includes information representing which control loops have experienced disturbances. For example, disturbance data 602 may include indications that loads or setpoints of control loops have changed significantly during varying periods of time. Disturbance data 602 may include indications of detected disturbances (e.g., provided by disturbance detector 532, other computing devices 510, etc.) and other values associated with a detected disturbance (e.g., when the disturbance occurred, control parameters at the time of the disturbance, etc.). In some embodiments, an indication of a detected disturbance may be a binary value that indicates whether or not a disturbance has been detected. For example, a value of "1" may be used to represent a detected disturbance, while a value of "0" may be used to represent that a control loop disturbance has not been detected.

Interaction detection module 530 may also include interaction measure generator 604. An interaction measure may be a statistic (e.g., a measure of association, a correlation, etc.) or other value that can be used to represent the degree of relation between disturbances of control loop pairs. The interaction measure may be a binary value (e.g., a loop interaction either exists or it does not). The interaction measure may also be a range of values for denoting an increasing or decreasing likelihood that a loop interaction exists. For example, the interaction measure may be rated on a scale of zero to ten, where ten represents the greatest likelihood that a control loop interaction exists.

In one embodiment, interaction measure generator 604 may generate a phi-coefficient value as the interaction measure. A phi-coefficient is a statistical measure of the association between two binary values. If indications of detected disturbances are stored in disturbance data 602 in binary form, interaction detection module 530 may calculate the total disturbances and non-disturbances for each category as follows:

TABLE 1

|  | y = 1 | y = 0 | Total |
|---|---|---|---|
| x = 1 | $n_{11}$ | $n_{10}$ | $n_{1\cdot}$ |
| x = 0 | $n_{01}$ | $n_{00}$ | $n_{0\cdot}$ |
| Total | $n_{\cdot 1}$ | $n_{\cdot 0}$ | n | where x, y are binary values that represent the presence or absence of disturbances in two control loops and $n_{ij}$ are counts of observations. Observations refer to those instances in which x, y have the corresponding values in Table 1. For example, if a disturbance is detected in a first loop and not in a second loop for a period of time, x=1 and y=0. Therefore, for that period of time, the corresponding count value, $n_{10}$, would be incremented by one. The counts are tallied over multiple periods of time. In various embodiments, observations may be made on a periodic basis, whenever a loop changes state between having no disturbance to having a disturbance or vice-versa, or at any other time (e.g., regular intervals, irregular intervals, etc.).

Interaction measure generator 604 may use counted observations to calculate a phi-coefficient. For example, interaction measure generator 604 may calculate a phi-coefficient using the values shown in Table 1 as follows:

$$\phi = \frac{n_{11}n_{00} - n_{10}n_{01}}{\sqrt{n_{1\cdot}n_{0\cdot}n_{\cdot 0}n_{\cdot 1}}}$$

where $n_{ij}$ are counts of observations according to the scheme of Table 1. The phi-coefficient can range from a value of −1 to 1, meaning that there may be a positive, negative, or zero level of association between the two control loops. For example, a phi-coefficient of 0 indicates that there is no association between the loops. A phi-coefficient of 1 indicates that there is a strong, positive association between the control loops. A positive association means that the values track together (e.g., if x becomes 1, y also becomes 1, etc.). A phi-coefficient of −1 indicates that there is a strong, negative association between the control loops (e.g., if x becomes 1, y becomes 0, etc.). Phi-coefficient values that range between −1 and 0, and between 1 and 0 provide a range from a strong association to that of no association.

Interaction measure generator 604 may also generate interaction measure values for two or more additional control loops in the system. In such a case, interaction measure generator 604 may generate any number of different interaction measure values using received disturbance data from the varying control loops. For example, if interaction detection module 530 evaluates three control loops (e.g., loop A, loop B, and loop C), interaction measure generator 604 may generate three interaction measure values (e.g., $\phi_{AB}$, $\phi_{BC}$, and $\phi_{AC}$). The set of interaction measure values may be stored in a table, list, database, matrix, or any other data structure in memory 504. For example, interaction measure generator 604 may populate an interaction matrix of the form:

$$P = \begin{bmatrix} 1 & \phi_{12} & \cdots & \phi_{1m} \\ \phi_{12} & 1 & \cdots & \vdots \\ \vdots & \vdots & \ddots & \phi_{(m-1)m} \\ \phi_{1m} & \cdots & \phi_{(m-1)m} & 1 \end{bmatrix}$$

where m is the total number of control loops analyzed. Such a matrix will have $$\frac{m}{2}(m-1)$$

unique interaction measure values and may be used to aggregate interaction measures for different areas of a building, the entire building itself, or even for a set of different buildings.

Other data structures may also be used to store multiple interaction measure values. Such data structures may draw each interaction measure value from a core interaction matrix as shown in the above paragraph. Interaction measure generator 604 may store, for example, interaction measure values in a table of the form:

TABLE 2

| Loops evaluated | Interaction measure value |
|---|---|
| AB | 0.55 |
| BC | 0.04 |
| AC | 0.03 |

Such a storage mechanism may be pre-populated with entries (e.g., with a set of loops to be evaluated), or a new entry may be entered after an interaction measure value is generated by interaction measure generator 604.

In some embodiments, interaction detection module 530 also includes interaction measure evaluator 606. Interaction measure evaluator 606 analyzes an interaction measure value generated by interaction measure generator 604 to evaluate the measure relative to rules or other logic. For example, rules may be established to evaluate the magnitude of interaction measures for different types of control loops differently. Highly temperature controlled building spaces may be associated with, for example, a rule such that a low level of interaction with another space may result in an alarm being generated by the system regarding risky interaction. Interactions between other building spaces (e.g., two break rooms) may be ignored entirely regardless of the degree of interaction. In other embodiments, interaction measure evaluator 606 may reside in the memory of another device in other computing devices 510. For example, interaction measure generator 604 may reside in the memory of a supervisory controller and generate interaction measure values for control loops under its supervision. Interaction measure generator 606 may reside in the memory of a controller as shown in FIG. 6, a supervisory controller, or server that receives interaction measure values from different supervisory controllers.

Interaction measure evaluator 606 analyzes interaction measure values to determine whether a control loop interaction condition can be deemed to exist (e.g., is likely to exist). In some embodiments, interaction measure evaluator 606 may utilize one or more threshold parameters to categorize an interaction measure value. For example, a threshold value may be used to categorize interaction measure values as being likely or unlikely of indicating that a control loop interaction condition exists. In another example, a plurality of threshold values may be used by interaction measure evaluator 606 to categorize an interaction measure value with greater granularity (e.g., strongly likely, weakly likely, weakly unlikely, strongly unlikely, etc.).

Interaction measure evaluator 606 may analyze the interaction measure values shown in Table 2. Interaction measure evaluator 606 may utilize one or more threshold values to categorize the interaction measure values. For example, interaction measure evaluator 606 may use a threshold of 0.5 to distinguish those interaction measure values that are likely to indicate a loop interaction from those that are not. In such a case, with reference to the above Table 2, interaction measure evaluator 606 may determine that a loop interaction condition is likely to exist between loop A and loop B, but that loop C does not interact with loops A and B.

In further embodiments, interaction measure evaluator 606 may determine which loops of a system are the most likely to interact. In such cases, interaction measure evaluator 606 may rank sets of loops by their interaction measure values and select one or more that are the most likely to have control loop interactions. For example, interaction measure evaluator 606 may determine the top ten pairs of loops that are most likely to interact based on their interaction measure values. This ranking or selection may be transmitted to another system for action (e.g., to establish an interaction compensator) or for reporting to a user 10 device.

Interaction measure evaluator 606 may also identify individual control loops that interact with multiple other control loops. For example, interaction measure evaluator 606 may determine that loop interactions are likely to exist between control loop A and control loop B, between control loop A and control loop C, and between control loop A and control loop D. Since control loop A is the common control loop in each of these likely interactions, interaction measure evaluator 606 may identify control loop A as being as requiring greater attention.

Interaction detection module 530 includes alert generator 608. Alert generator 608 receives one or more indications of likely control loop interactions from interaction measure evaluator 606 and uses the indications to generate alert notifications about potential control loop interactions. Alert notifications may include data indicative of whether two or more control loops are interacting. Alert notifications may also include a set or list of loops that potentially interact. For example, interaction measure evaluator 606 may identify a set of ten most likely loops that are interacting. In such a case, alert generator 608 may generate an alert notification that provides information about the identified loops.

In one embodiment, alert generator 608 may generate a notification for a user interface device (e.g., a display, a speaker, or any other electronic device that conveys information to a user) that is part of other computing devices 510. For example, alert generator 608 may generate an email, a text message, a notification within a diagnostic application, indicia within a supervisory control and data acquisition (SCADA) program, or another form of alert that electronically conveys information to a user. Such alerts may be used by a technician to correct the cause of a loop interaction. Alert generator 608 may also include diagnostic information regarding loop interactions. The diagnostic information may include potential causes of a loop interaction, suggested corrective actions, and other information that can be used by a technician to evaluate a potential loop interaction detected by interaction detection module 530.

In some embodiments, alert generator 608 may generate an alert notification that can be used to automatically compensate for the presence of a loop interaction. For example, alert generator 608 may provide an alert to a controller or server (e.g., other computing devices 510) that is configured to automatically compensate for the presence of a loop interaction. In one example, a supervisory controller that controls two interacting loops may receive an alert notification from alert generator 608 that indicates the two loops it supervises are interacting. In response, the supervisory controller may override the setpoints used in the two loops, to compensate for the two loops interacting.

In varying embodiments, interaction detection module 530 may be stored in the memory of a different device than that of adaptive feedback control module 520. For example, interaction detection module 530 may be implemented in a supervisory controller that receives disturbance data from two or more controllers that it supervises. In another example, interaction detection module 530 may be implemented in a server or other computing device that receives disturbance data (e.g., an indication of a detected disturbance, control loop data, etc.) and uses the disturbance data to detect loop interactions. In yet another example, interaction detection module 530 may be implemented as a stand-alone device that monitors the control loops of a plurality of controllers and determines if the loops interact.

Figure 7A:
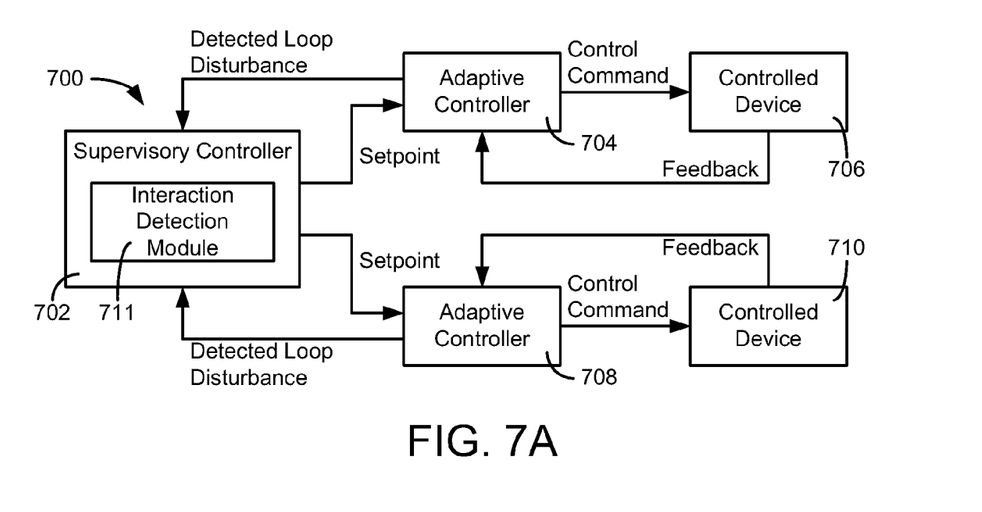
FIG. 7A-7C are block diagrams of control systems configured to detect loop interactions, according to various exemplary embodiments.
Figure 7B:
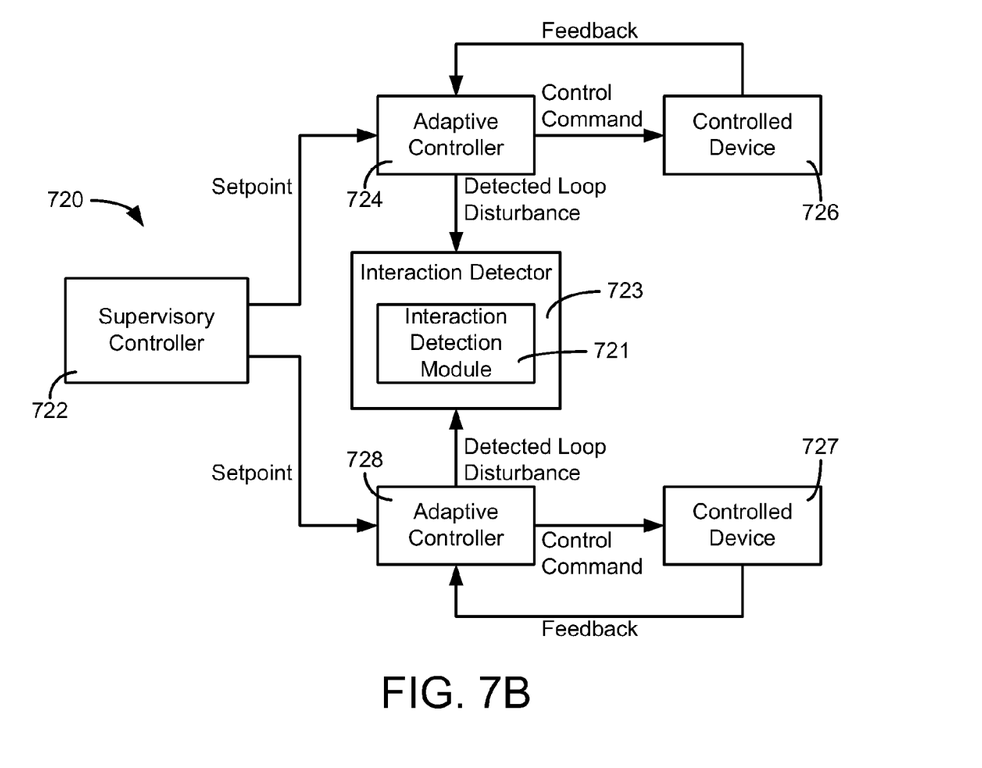
Figure 7C:
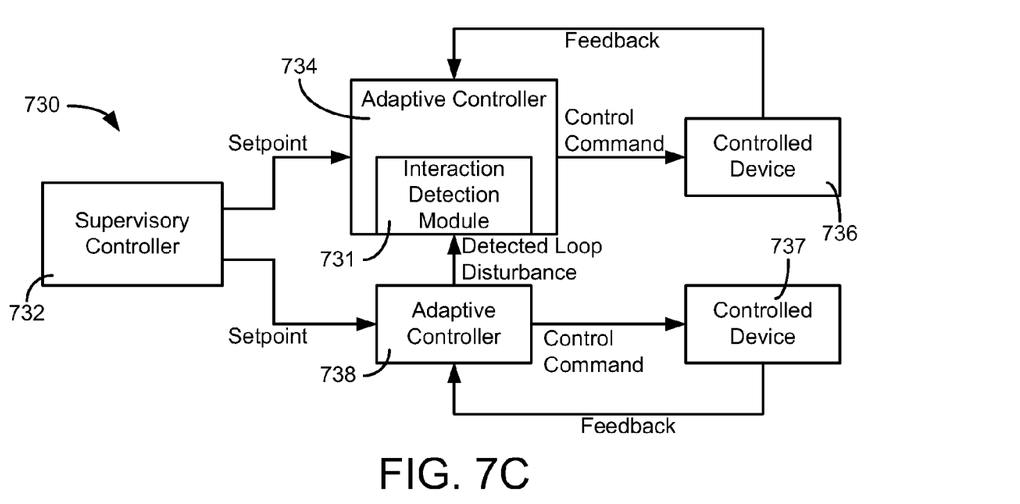

Referring now generally to FIGS. 7A-7C, control systems configured to detect loop interactions are shown, according to various exemplary embodiments. In FIG. 7A, control system 700 includes two control loops that control separate controlled devices 706, 710. Control system 700 also includes supervisory controller 702, which provides setpoints for the two control loops. In the first control loop, adaptive controller 704 provides a control command to controlled device 706. For example, controlled device 706 may be an actuator in an HVAC system that is used to regulate the flow of conditioned air to a building zone. Similarly, adaptive controller 708 provides a control command to controlled device 710. Supervisory controller 702 provides setpoints to adaptive controllers 704, 708. In one example, supervisory controller 702 may provide desired room or zone temperatures to adaptive controllers 704, 708. Adaptive controllers 704, 708 may also receive feedback relating to controlled devices 706, 710 (e.g., a measurement from a sensor, an estimated response from the device, etc.). Adaptive controllers 704, 708 use their respective setpoints and feedback values to generate control commands for controlled devices 706, 710. For example, adaptive controller 704 may generate a control command for controlled device 706 by comparing its feedback value to its setpoint.

Adaptive controllers 704, 708 may also utilize adaptive control strategies to generate their respective control commands. Adaptive controllers 704, 708 may include loop disturbance detection modules which detect disturbances in the control loops. In response to detecting loop disturbances, adaptive controllers 704, 708 may adaptively tune their operations by adjusting one or more control parameters. For example, adaptive controller 704 may adjust a gain value used as part of its control system transfer function.

As shown in FIG. 7A, supervisory controller 702 includes interaction detection module 711 (e.g., in the memory of supervisory controller 702). Supervisory controller 702 utilizes interaction detection module 711 to determine whether the respective control loops of adaptive controllers 704, 708 interact. Supervisory controller 702 receives indications of detected loop disturbances from adaptive controllers 704, 708. In some embodiments, supervisory controller 702 may receive indications of detected loop disturbances from other control loops, in addition to those controlled by adaptive controllers 704, 708. Interaction detection module 760 stores the received indications in a history of detected loop disturbances (e.g., in disturbance data 602). Interaction detection module 760 uses the stored history of loop disturbances to determine whether a loop interaction exists between the control loops of adaptive controllers 704, 708.

In some embodiments, supervisory controller 702 may perform compensating measures in response to interaction detection module 711 detecting a loop interaction between the control loops of adaptive controllers 704, 708. For example, supervisory controller 702 may override the setpoint provided to either or both of adaptive controllers 704, 708. In further embodiments, supervisory controller 702 may provide an alert to another electronic device in addition to, or in lieu of, performing compensating or corrective measures. For example, supervisory controller 702 may provide an alert to a server, workstation, or other controller, to alert a technician to the possibility that the control loops of adaptive controllers 704, 708 interact.

As shown in FIG. 7B, control system 720 includes an interaction detection module 721 that resides within a stand-alone electronic device, i.e., interaction detector 723. Interaction detector 723 includes a processing circuit that receives indications of detected loop disturbances from adaptive controllers 724, 728. In some embodiments, interaction detector 723 may also receive indications of detected loop disturbances from other adaptive controllers. Interaction detector 723 may use the received indications of detected loop disturbances. Interaction detector 723 may analyze the loop disturbance data and generate an alert if a loop interaction is detected. For example, interaction detector 723 may provide an alert to adaptive controllers 724, 728 and/or to supervisory controller 722. In response to such an alert, the adaptive controllers 724, 728 or supervisory controller 722 may perform interaction compensation or other corrective measures. In another example, interaction detector 723 may provide an alert to another device, to alert a technician to the loop interaction.

As shown in FIG. 7C, control system 730 includes an interaction detection module 731 that resides within the memory of an adaptive controller (e.g., in the memory of adaptive controller 734). In this configuration, adaptive controller 734 may determine that a loop disturbance exists within its control loop and provide an indication of this to interaction detection module 731. Adaptive controller 734 may also receive indications of loop disturbances from other control loops, such as that of adaptive controller 734. For example, adaptive controller 734 may provide an indication of a detected loop disturbance to adaptive controller 734 directly or indirectly (e.g., by sending the indication via supervisory controller 732 or other controllers). For example, interaction detection module 731 may provide an alert to adaptive controllers 734, 738 and/or to supervisory controller 732. In response to receiving the alert, the adaptive controllers to perform corrective measures. In another example, interaction detection module 731 may provide an alert to another device, to alert a technician to the loop interaction. In response to detecting a loop disturbance, adaptive controller 734 may generate an alert for another controller (e.g., supervisory controller 732, adaptive controller 738, etc.) and/or for another computing device (e.g., a server, workstation, portable electronic device, etc.).

In further embodiments, interaction detection module 731 may reside in the memory of other computing devices associated with the control loops of adaptive controllers 734, 738. For example, interaction detection module 731 may reside in the memory of a workstation, server, portable electronic device utilized by a technician, or any other computing device that receives data regarding the operation of controlled devices 736, 737. In further embodiments, the components of interaction detection module 731 may be distributed across any number of devices in a control system. For example, a history of detected loop disturbances may be maintained in a plurality of supervisory controllers and accessed over a network by an interaction measure generator residing in the memory of a workstation.

Figure 8:
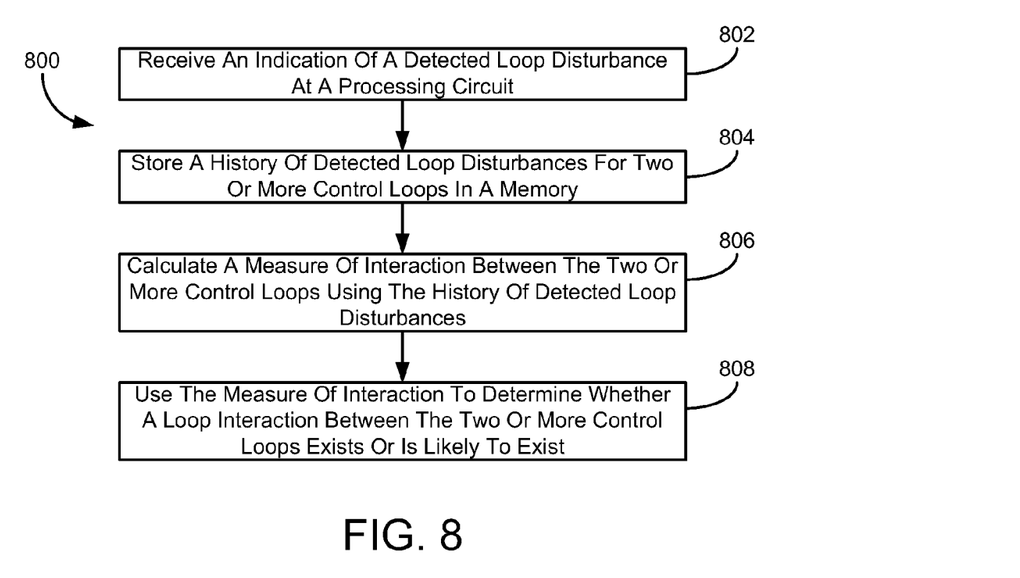
FIG. 8 is a flow chart of a process for detecting the presence of a control loop interaction, according to an exemplary embodiment.

Referring now to FIG. 8, a process 800 for detecting the presence of a loop interaction is shown, according to an exemplary embodiment. Process 800 includes receiving an indication of a detected loop disturbance (block 802). A loop disturbance may be detected by determining the presence of a change in a setpoint, load, or other parameter of a control loop that indicates that the control loop does is not operating as expected. A loop disturbance may be detected by an adaptive controller (e.g., a PRAC controller or another adaptive controller). Detected loop disturbances may be used, for example, by the adaptive controller to adaptively tune the control loop (e.g., by adjusting the proportional gain, integral gain, or other parameter used to provide control over a device).

An indication of a detected loop disturbance may be received at a processing circuit. In general, an indication of a detected loop disturbance may be a simple binary value (e.g., indicating whether or not a loop disturbance has been detected) or include additional data concerning the detected loop disturbance (e.g., a timestamp, an indication of the adaptive controller that experienced the loop disturbance, or other relevant data). For example, a supervisory controller may receive an indication of a detected loop disturbance from one of the adaptive controllers under its control.

Process 800 also includes storing a history of detected loop disturbances for two or more control loops in a memory (block 804). The history of detected loop disturbances may include, for example, indications of when loop disturbances are detected in a plurality of control loops. The history may also include counts of the number of times in which a control loop disturbance is detected, the number of times in which a control loop is not detected, or other forms of aggregated data about detected control loop disturbances.

Process 800 further includes calculating a measure of interaction between the two or more control loops using the history of detected loop disturbances (block 806). In general, a measure of interaction may be a statistic, value, or other indicator of the relationship between loop disturbances. For example, a measure of interaction may be a mean-square contingency coefficient. In one embodiment, a matrix of mean-square contingency coefficients for three control loops may determined using the following code (shown for use in Matlab):

```
pairs = [1 2;1 3;2 3];
PHI ones(3,3);
for n 1:3,
        x = dataY(:,pairs(n,1));
        y = dataY(:,pairs(n,2));
        n11 = length(find(y==1 & x==1));
        n10 = length(find(y==0 & x==1));
        n01 = length(find(y==1 & x==0));
        n00 = length(find(y==0 & x==0));
        nx1 = length(find(y==1));
        nx0 = length(find(y==0));
        n1x = length(find(x==1));
        n0x = length(find(x==0));
        phi = (n11*n00-n10*n01)/sqrt(n1x*n0x*nx0*nx1);
        PHI(pairs(n,1), pairs(n,2)) = phi;
        PHI(pairs(n,2) ,pairs(n,1)) = phi;
end
```

Such code may be adapted to other programming languages and/or to determine measures of interaction between any number of different control loops. In other embodiments, other measures of interaction may be determined between the two or more control loops.

Process 800 also includes using the measure of interaction to determine whether a loop interaction between the two or more control loops exists or is likely to exist (block 808). In one embodiment, a measure of interaction may be compared to one or more threshold parameters to determine whether two loops interact. In another embodiment, a plurality of measures of interaction may be compared to determine a set of control loops that are likely to interact. For example, the set of control loops may be those pairs of control loops that have the ten highest measures of interaction. In some embodiments, such a set may be provided as an alert to a user interface (e.g., a display, a speaker, etc.), to alert a technician as to those control loops that are most likely to interact.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for detecting a control loop interaction, the method comprising:
   receiving an indication of a control loop disturbance detected by a controller for a first control loop, wherein the control loop disturbance is a change detected in the first control loop that exceeds a disturbance detection threshold;
   storing, in a memory, a history of detected loop disturbances for the first control loop and at least a second control loop, wherein each of the detected loop disturbances is stored with a time parameter indicating a time at which the disturbance is detected;
   using the history of detected loop disturbances to assign each of a plurality of time periods to one of categories (a), (b), (c), and (d) according to whether a disturbance is detected or not detected during the time period in each of the first and second control loops, wherein a time period is assigned to:
      category (a) if a disturbance is detected in the first control loop and not detected in the second control loop during the time period,
      category (b) if a disturbance is detected in the second control loop and not detected in the first control loop during the time period,
      category (c) if a disturbance is detected in both the first control loop and the second control loop during the time period, and
      category (d) if a disturbance is detected in neither the first control loop nor the second control loop during the time period;
   generating and storing a set of variables that indicate a quantity of the time periods assigned to each of categories (a)-(d);
   calculating, by a processor, a measure of interaction between the first and second control loops using the set of variables, the measure of interaction indicating a statistical correlation between the times at which disturbances are detected in the first control loop and the times at which disturbances are detected in the second control loop;
   determining whether a loop interaction exists between the first and second control loops based in part on the measure of interaction; and
   using a communications interface to transmit data representing the result of the determination.

2. The method of claim 1, wherein the controller for the first control loop is an adaptive controller configured to detect the disturbance by detecting a setpoint change for the first control loop controlled by the adaptive controller.

3. The method of claim 1, wherein the controller for the first control loop is an adaptive controller configured to detect the disturbance by detecting a load change in a control loop controlled by the adaptive controller.

4. The method of claim 1, wherein the disturbance is at least one of:
   (a) a load change;
   (b) a setpoint change;
   (c) a measured variable change beyond a tolerance limit;
   (d) a measured variable change beyond a historical deviation from a setpoint; and
   (e) a significant measured variable change.

5. The method of claim 1, wherein the controller is a pattern recognition adaptive controller.

6. The method of claim 1, wherein the indication of the control loop disturbance comprises a binary value and the interaction measure comprises a mean-square contingency coefficient.

7. The method of claim 1, wherein the loop interaction is determined to exist by comparing the measure of interaction to a threshold value.

8. The method of claim 1, further comprising calculating a plurality of measures of interaction between different sets of two or more control loops and determining a set of possible loop interactions based on the plurality of measures of interaction.

9. The method of claim 1, wherein the control loops control devices of a heating, ventilation, and air conditioning system.

10. The method of claim 1, further comprising adjusting a setpoint of the controller in response to a determination that a loop interaction exists for a control loop controlled by the adaptive controller.

11. A system for detecting a control loop interaction comprising:
   a processing circuit configured to store, in a memory, a history of detected loop disturbances for two or more control loops, wherein each of the detected loop disturbances is stored with a time parameter indicating a time at which the disturbance is detected;
   wherein the processing circuit is configured to use the history of detected loop disturbances to assign each of a plurality of time periods to one of categories (a), (b), (c), and (d) according to whether a disturbance is detected or not detected during the time period in each of the first and second control loops, wherein a time period is assigned to:
      category (a) if a disturbance is detected in the first control loop and not detected in the second control loop during the time period,
      category (b) if a disturbance is detected in the second control loop and not detected in the first control loop during the time period, category (c) if a disturbance is detected in both the first control loop and the second control loop during the time period, and category (d) if a disturbance is detected in neither the first control loop nor the second control loop during the time period;

wherein the processing circuit is configured to generate and store a set of variables that indicate a quantity of the time periods assigned to each of categories (a)-(d);

wherein the processing circuit is configured to calculate a measure of interaction between the two or more control loops using the set of variables, the measure of interaction indicating a statistical correlation between the times at which disturbances are detected in the two or more control loops;

wherein the processing circuit is configured to determine whether a loop interaction exists between the two or more control loops based in part on the measure of interaction; and wherein the processing circuit causes a communications interface to transmit a message representing that a loop interaction exists when the determination is positive.

12. The system of claim 11, wherein the processing circuit is further configured to provide adaptive control over one or more control loops and to detect a loop disturbance in the one or more control loops.

13. The system of claim 12, wherein the processing circuit is configured to detect a loop disturbance by detecting a load change in the one or more control loops.

14. The system of claim 12, wherein the processing circuit is configured to detect a loop disturbance by detecting a setpoint change in the one or more control loops.

15. The system of claim 12, wherein the processing circuit is further configured to adjust a setpoint of the one or more control loops in response to a determination that a loop interaction exists for the one or more control loops controlled by the processing circuit.

16. The system of claim 11, wherein the processing circuit further comprises an interface configured to receive indications of loop disturbances from two or more controllers and to store the indications in the history of detected loop disturbances.

17. The system of claim 11, wherein the history comprises binary values and the interaction measure comprises a mean-square contingency coefficient.

18. The system of claim 11, wherein the processing circuit is further configured to calculate a plurality of measures of interaction between different sets of two or more control loops and to determine a set of loop interactions based on the plurality of measures of interaction.

19. A system for detecting a control loop interaction in a heating, ventilation, and air conditioning (HVAC) system comprising:

a first control loop comprising a first adaptive controller configured to provide control over a first HVAC device and to detect loop disturbances when controlling the first HVAC device;

a second control loop comprising a second adaptive controller configured to provide control over a second HVAC device and to detect loop disturbances when controlling the second HVAC device; and a processing circuit configured to receive indications of detected loop disturbances from the first controller and the second controller, the detected loop disturbances comprising detected changes that exceed a disturbance detection threshold;

wherein the processing circuit is further configured to store, in a memory, a history of the detected loop disturbances, wherein each of the detected loop disturbances is stored with a time parameter indicating a time at which the disturbance is detected;

wherein the processing circuit is configured to use the history of detected loop disturbances to assign each of a plurality of time periods to one of categories (a), (b), (c), and (d) according to whether a disturbance is detected or not detected during the time period in each of the first and second control loops, wherein a time period is assigned to:

category (a) if a disturbance is detected in the first control loop and not detected in the second control loop during the time period, category (b) if a disturbance is detected in the second control loop and not detected in the first control loop during the time period, category (c) if a disturbance is detected in both the first control loop and the second control loop during the time period, and category (d) if a disturbance is detected in neither the first control loop nor the second control loop during the time period;

wherein the processing circuit is configured to generate and store a set of variables that indicate a quantity of the time periods assigned to each of categories (a)-(d);

wherein the processing circuit is configured to calculate a measure of interaction between the first and second control loops using the set of variables, the measure of interaction indicating a statistical correlation between the times at which disturbances are detected in the first control loop and the times at which disturbances are detected in the second control loop;

wherein the processing circuit is configured to determine whether a loop interaction exists between first and second control loops based in part on the measure of interaction; and wherein the processing circuit is further configured to cause a communications interface to transmit data representative of the result of the determination.

20. The system of claim 19, wherein the first and second adaptive controllers utilize pattern recognition adaptive control;

wherein the first HVAC device comprises at least one of a damper, a mixer, a chiller, a heater, a valve, an air handling unit (AHU), a variable air ventilation (VAV) box, or a fan.

* * * * *